(12) United States Patent
Schwartz

(10) Patent No.: US 10,315,574 B2
(45) Date of Patent: Jun. 11, 2019

(54) OUTSIDE REAR VIEW MIRROR SYSTEM

(71) Applicant: KELSEY-HAYES COMPANY, Livonia, MI (US)

(72) Inventor: Allen Schwartz, Oxford, MI (US)

(73) Assignee: KELSEY-HAYES COMPANY, Livonia, MI (US)

( * ) Notice: Subject to any disclaimer, the term of this patent is extended or adjusted under 35 U.S.C. 154(b) by 211 days.

(21) Appl. No.: 15/303,240

(22) PCT Filed: Jun. 5, 2015

(86) PCT No.: PCT/US2015/034365
§ 371 (c)(1),
(2) Date: Oct. 11, 2016

(87) PCT Pub. No.: WO2015/191378
PCT Pub. Date: Dec. 17, 2015

(65) Prior Publication Data
US 2017/0080864 A1    Mar. 23, 2017

Related U.S. Application Data

(60) Provisional application No. 62/009,470, filed on Jun. 9, 2014.

(51) Int. Cl.
*B60R 1/07* (2006.01)
*G05G 9/047* (2006.01)
*B60R 1/074* (2006.01)
*B60R 1/072* (2006.01)

(52) U.S. Cl.
CPC ............... *B60R 1/07* (2013.01); *B60R 1/072* (2013.01); *B60R 1/074* (2013.01); *G05G 9/047* (2013.01)

(58) Field of Classification Search
CPC ........... B60R 1/07; B60R 1/072; B60R 1/074; G05G 9/047
USPC ........................................................... 701/49
See application file for complete search history.

(56) References Cited

U.S. PATENT DOCUMENTS

| 4,504,117 A | 3/1985 | Mittelhaeuser |
| 5,008,603 A * | 4/1991 | Nakayama ............... B60R 1/07 307/10.2 |

FOREIGN PATENT DOCUMENTS

| CN | 2027-28090 | * | 2/2013 |
| CN | 202728090 U | | 2/2013 |
| CN | 203063818 U | | 7/2013 |
| JP | 2002-008350 | * | 1/2007 |
| JP | 2007-008350 | * | 1/2007 |

(Continued)

OTHER PUBLICATIONS

PCT/US15/34365 International Search Report and Written Opinion, dated Aug. 14, 2015.

*Primary Examiner* — Muhammad Shafi
(74) *Attorney, Agent, or Firm* — Tarolli, Sundheim, Covell & Tummino LLP

(57) ABSTRACT

A system for controlling movement of an outside rear view mirror of a vehicle having a plurality of outside rear view mirrors, each mirror including a housing and at least one motor configured to control mirror tilt, and one motor to control an inward/outward fold of the housing. An electronic control unit processes movement commands in response to one or more switches. Each motor is connected to a shared driveline, and each motor is further connected to an associated driveline.

8 Claims, 5 Drawing Sheets

(56) References Cited

FOREIGN PATENT DOCUMENTS

JP 2007008350 A 1/2007

* cited by examiner

OUTSIDE REAR VIEW MIRROR SYSTEM

CROSS-REFERENCE TO RELATED APPLICATION

The present application hereby claims priority to U.S. Provisional Patent Application Ser. No. 62/009,470, entitled OUTSIDE REAR VIEW MIRROR MOTORIZED FOLD SYSTEM to Allen K. Schwartz, filed Jun. 9, 2014, assigned and which is hereby incorporated herein by reference.

FIELD OF THE INVENTION

The present invention is directed to an outside rear view mirror power system for use with vehicles.

BACKGROUND

Modern vehicle systems increasingly utilize electronic controls for a variety of operations. The proliferation of electronic systems adds convenience and functionality, but also increases processing needs and wiring complexity. The added complexity further increases the strain on power systems as well as adds weight to the vehicle, which requires additional energy to provide uninterrupted use of the increased number of features that have become standard in many vehicle platforms.

SUMMARY OF THE INVENTION

An outside rear view mirror control system, in accordance with the present invention, reduces the complexity and resources needed to control a motorized mirror fold system for a plurality of mirrors. The system of the present invention departs from existing mirror fold control system approaches by integrating wiring and coupling elements, thereby simplifying the manufacture and reducing costs for such a system.

In accordance with an example embodiment of the present invention, a system for controlling movement of an outside rear view mirror of a vehicle includes one or more outside rear view mirrors, each mirror comprising a mirror housing and at least one motor configured to control mirror tilt, and one motor to control an inward/outward fold of the mirror housing. An electronic control unit includes a controller to process mirror movement commands, one or more switches to provide said mirror movement commands, and a plurality of drivelines. Each of the motors is connected to a shared driveline and to an associated driveline.

In accordance with one aspect of the present invention, the electronic control unit is connected to an ignition switch to actuate a mirror fold motor in response to a state of the ignition switch.

In accordance with another aspect of the present invention, a fold command switch is used to control the mirror fold motor.

DETAILED DESCRIPTION

The present invention provides a system and method for controlling movement of an outside rear view mirror (also known in the art as a side view mirror) located in a mirror housing that includes a folding function of the outside rear view mirror housing. Rear view mirror assemblies include two mirror control motors, one for controlling vertical tilt and one for controlling horizontal tilt. A third motor is provided to controlling a folding function of the entire mirror housing relative to the vehicle body. Known remote control mirror assembly systems have required a plurality of drivelines to provide commands to control the drive motors. The outside rear view mirror assembly in accordance with an example embodiment of the present invention described herein employs fewer drivelines in order to control associated drive motors.

Figure 1:
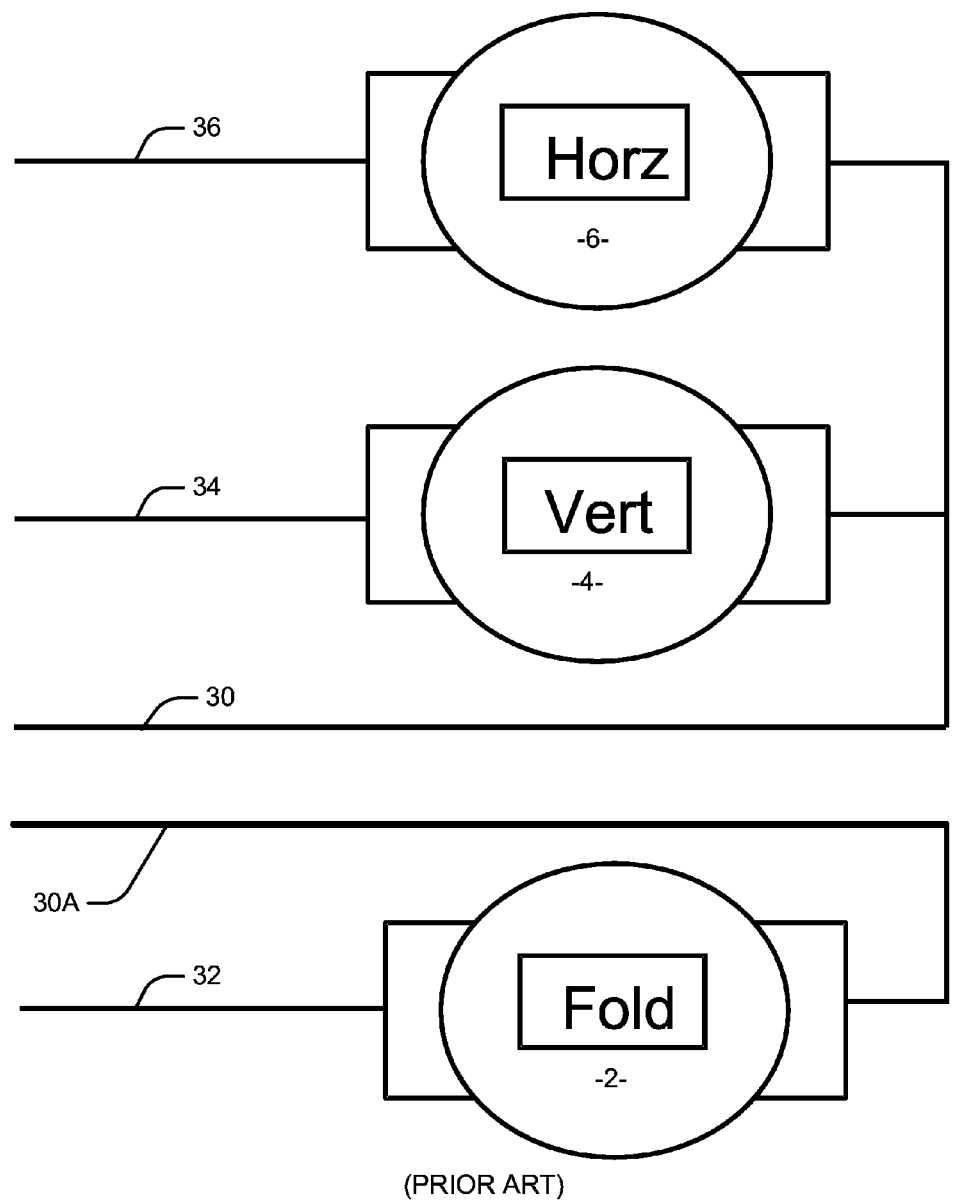
FIG. 1 is a schematic block diagram illustrating a conventional mirror fold system.

FIG. 1 illustrates a conventional remote control mirror wiring system. In FIG. 1, horizontal motor 6 and vertical motor 4 have a respective control line 36 and 34, but share a driveline 30. Further, fold motor 2 has a dedicated control line 32 and a dedicated driveline 30A.

Figure 2:
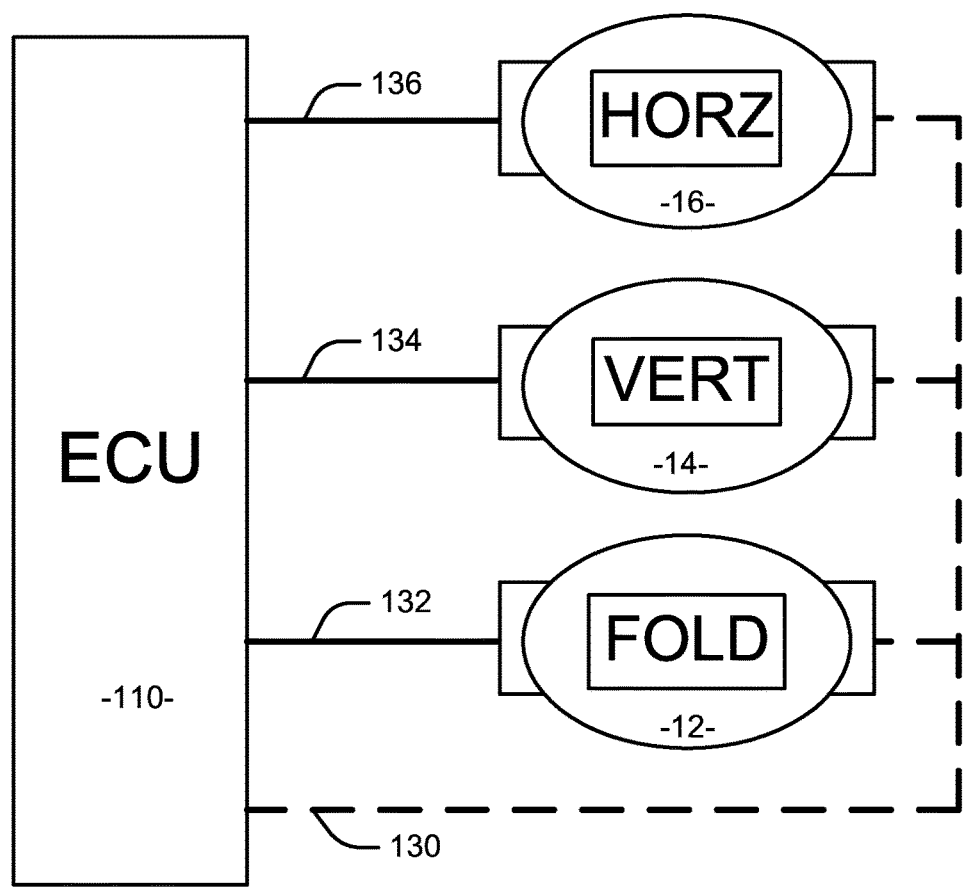
FIG. 2 is a schematic block diagram illustrating an improved mirror fold system in accordance with an example embodiment of the present invention.

FIG. 2 illustrates an improved mirror wiring system in accordance with an example embodiment of the present invention. FIG. 2 illustrates a single mirror with multiple motor connections, each to provide a movement or adjustment for the mirror and the mirror housing. In the example of FIG. 2, the mirror includes a horizontal control motor 16 for controlling horizontal tilt, a vertical control motor 14 for controlling vertical tilt, and a fold control motor 12 for controlling the position of the mirror housing assembly relative to the vehicle body. Each of the control motors is connected to an electronic control unit (ECU) 110 by one or more drivelines. For example, the horizontal tilt control motor 16 is connected by a horizontal driveline 136, the vertical tilt control motor 14 is connected by a vertical driveline 134, and housing assembly fold control motor 12 is connected by fold driveline 132. In accordance with the present invention as shown in the example embodiment of FIG. 2, a dedicated second driveline 30A to the fold control motor 12 is eliminated and the fold control motor 12 shown in FIG. 1 is reconfigured to connect to the shared driveline 130.

In some vehicle platforms, user controls for each of the above-mentioned control motors can be situated on the driver's side door panel (e.g., the left side of the vehicle), which would require a plurality of cut lines to accomplish the desired control features. A cut line is a particular length of wire that runs from one terminal connection to another. Typically, if the control switch is in the driver door, one piece of wire or cut line runs between each switch terminal and its associated motor terminal in the driver door. If the control switch is in the driver door and the mirror motor is in the passenger door, each connection between the switch terminals and the associated motor terminals requires three pieces of wire or three cut lines with the first cut wire being in the driver door, the second cut wire extending through the dash board and the third cut wire being in the passenger door. The three cut wire or cut lead grouping requires two connectors to connect the door cut line, the dash board cut line and the passenger door cut line together. By eliminating the dedicated driveline 30A, a cut lead (e.g., wiring) to the left mirror (driver's side) is eliminated, as well as three cut leads that were previously required for controlling a mirror fold control motor 12 for the right (passenger side) mirror. In effect, by sharing the driveline 130 with each motor 12, 14 and 16 of the drivers side and motor 12', 14' and 16' in passenger's side mirrors, three cut leads and two couplings (e.g., cut lead connections) are eliminated. See, for example, FIG. 4. The resulting system is less complex and has fewer material requirements for the manufacturing thereof, yet maintains functionality of each mirror control.

Figure 3:
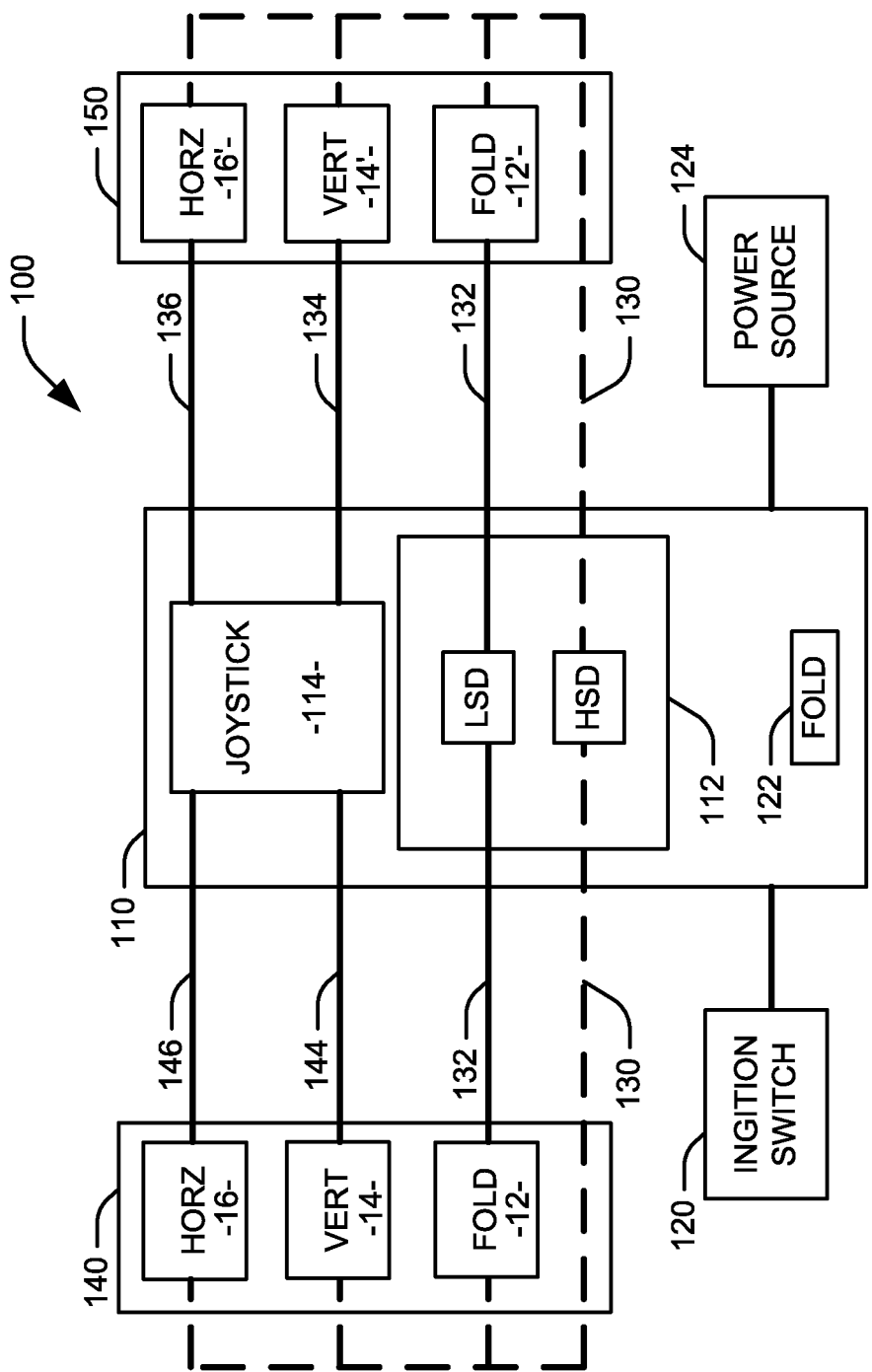
FIG. 3 is a schematic block diagram illustrating a control circuit for an outside rear view mirror single wire power fold system in accordance with an example embodiment of the present invention.

FIG. 3 is a schematic block diagram of a system 100 in accordance with an example embodiment of the present invention. In accordance with one example embodiment of the present invention, the system 100 includes an electronic control unit (ECU) 110 programmed to execute a control process, including one or more commands. Those skilled in the art will appreciate that the control functions of the system 100 could be accomplished by using discrete circuitry, a combination of different types of circuitry, or an application specific integrated circuit ("ASIC") and can be embodied in either the analog or digital domain. The ECU 110 is in electrical communication with each exterior mirror of the vehicle platform, typically an outside drivers side view mirror 140 and an outside passengers side view mirror 150 each contained in an associated housing. The ECU 110 is configured to operate one or more motors in each of the mirrors in response to commands from a user. Alternatively, the ECU 110 may adjust one or more mirrors automatically following a predetermined action or actions. For example, each mirror may include one or more control motors to provide for vertical and horizontal tilt (e.g., motors 14, 16), as well as extending or retracting a housing of the mirror (e.g., motor 12) relative to the vehicle body. Extending and retracting of the housing of the mirror is referred to as folding. ECU 110 is connected to each mirror by one or more drivelines through which to provide motor control and, in turn, control of the mirror vertical and horizontal tilt positions as well as control of the fold function of the housing. In the example of FIG. 3, all of the motors of outside drivers side view mirror 140 and outside passenger's side view mirror 150 are connected to the ECU 110 by a shared driveline 130. A fold driveline 132 is connected to both of the fold mirror motors 12 and 12'. The vertical and tilt motors 14, 16 of driver's side mirror 140 are connected to the ECU 110 by a vertical driveline 144 and a horizontal driveline 146 respectively, whereas motors 14', 16' of passenger's side mirror 150 are connected to the ECU 110 by a vertical driveline 154 and a horizontal driveline 156, respectively.

A user can operate one or more input controls associated with mirror movement. Such input can be initiated by a user or alternatively provided automatically in response to a specific action. By way of the input controls, a specific mirror and function can be selected and operated for each mirror. For instance, a switch 116 can select one of a driver's side mirror control or a passengers side mirror control. A joystick 114 then controls the horizontal and vertical tilt movement of the selected mirror by engaging one of a horizontal control and a vertical control. Joystick 114 can be configured to manipulate the movement of the selected mirror, for example, by pressing the joystick 114 forward and backward so that the selected mirror can be tilted vertically up or down. By pressing joystick 114 to the left and right, the selected mirror can be tilted horizontally. When not engaged, joystick 114 is biased in a null position, disconnecting each of the horizontal control and the vertical control from power source 124. Moreover, predetermined settings can be assigned to one or more drivers. As an example, upon identification of a particular user (e.g., by a key with one or more identifiers, or by entrance of a code associated with the driver), the ECU 110 can automatically adjust one or more mirror movements to a predetermined position associated with the particular user.

Alternatively, the controller can also be configured to respond to a fold command signal, such as through a user input. As an example, a user may initiate a mirror fold by engaging fold switch 122. Fold switch 122 can send a signal to the microprocessor 112 to send a current through a driveline 130 or 132 in order to reverse the position of the mirror housing. For example, if the mirror housing is retracted (i.e., folded inward against the vehicle body), engaging the fold switch 122 can initiate outward movement to extend the mirror housing into the normal operating position. If the mirror is extended, engaging the fold switch 122 can initiate inward movement to fold the mirror housing inward against the vehicle body.

Additionally, the ECU 110 can respond to a vehicle ignition switch 120 to automatically initiate an inward or outward fold of the mirror housing of one or both mirrors 140 and 150. In one embodiment, by engaging (e.g., turning on) the ignition switch 120 in preparation for operating the vehicle, the ECU 110 can send a signal to fold the mirror or mirrors outward. When the ignition switch 120 is disengaged (e.g., turned off), the ECU 110 can send a signal instructing the mirror housing to fold each of the mirror housings inward, to reduce the mirror profile. For example, when a voltage is provided in a first direction, such as through the fold driveline 132, the mirror may fold outward. When a voltage is provided in the opposite direction, such as through the shared driveline 130, the mirror may fold inward.

Figure 4:
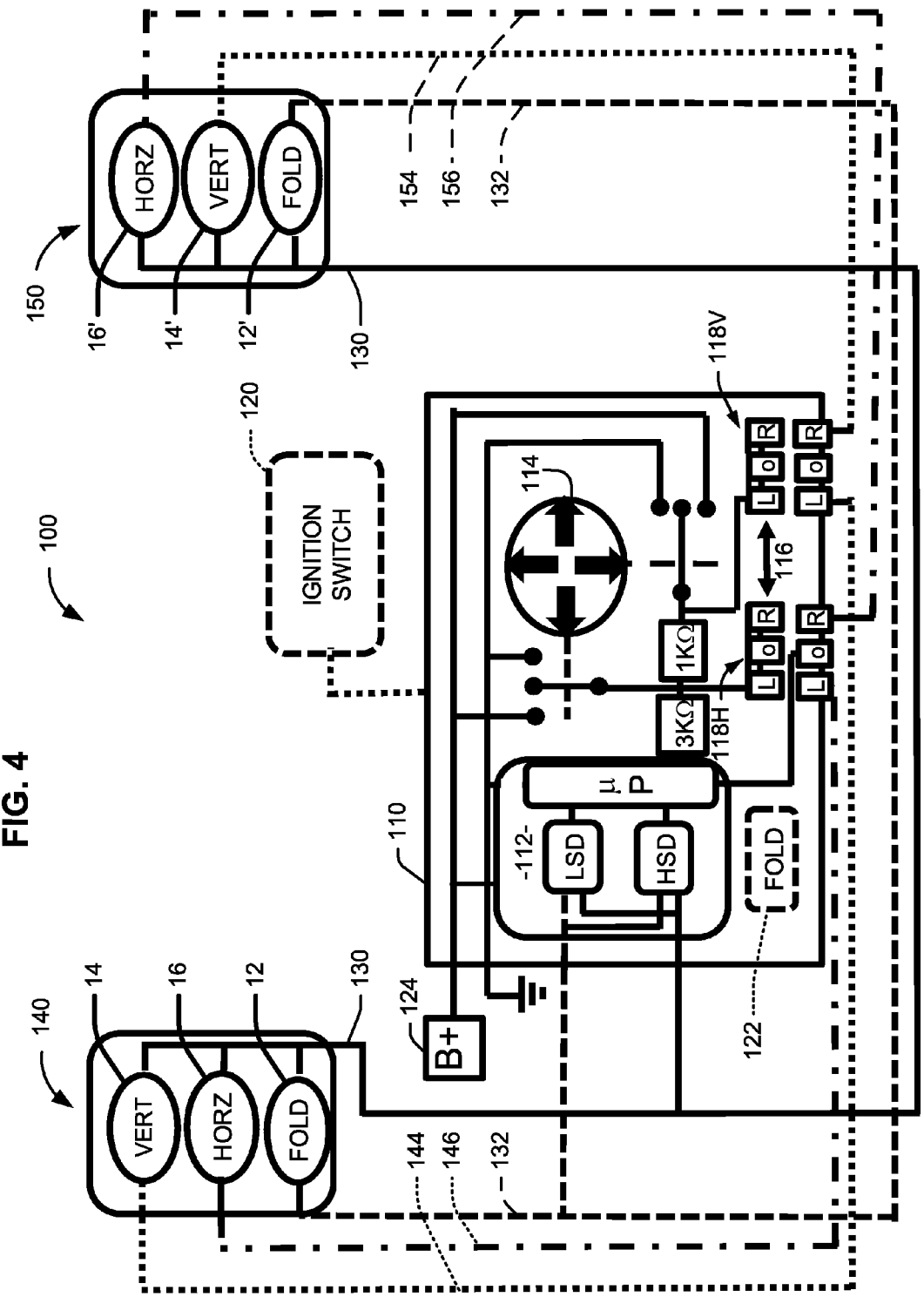
FIG. 4 is another schematic block diagram illustrating a control circuit for an outside rear view mirror single wire power fold system in accordance with an example embodiment of the present invention.

FIG. 4 illustrates another schematic block diagram of the system 100 provided in FIG. 3. In addition to the features described with respect to FIG. 3, the example embodiment shown in FIG. 4 provides the power source 124 such as from the vehicle battery, denoted with a B+, to provide electrical current to the motors. The ECU 110 further includes a microprocessor 112 and a low side drive (LSD) circuit and a high side drive (HSD) circuit. Further, the joystick 114 controls the horizontal and vertical tilt movement of the selected mirror by engaging one of a horizontal control 118H and a vertical control 118V. Joystick 114 can be configured to manipulate the movement of the selected mirror, for example, by pressing the joystick 114 forward and backward so that the selected mirror can be tilted vertically up or down. By pressing joystick 114 to the left and right, the selected mirror can be tilted horizontally. Therefore, when the joystick 114 not engaged and in a null position, each of the horizontal control 118H and vertical control 118V is disconnected from the power source 124, and each mirror is thus maintained in the current position until a new user input is provided via the joystick 114.

Figure 5:
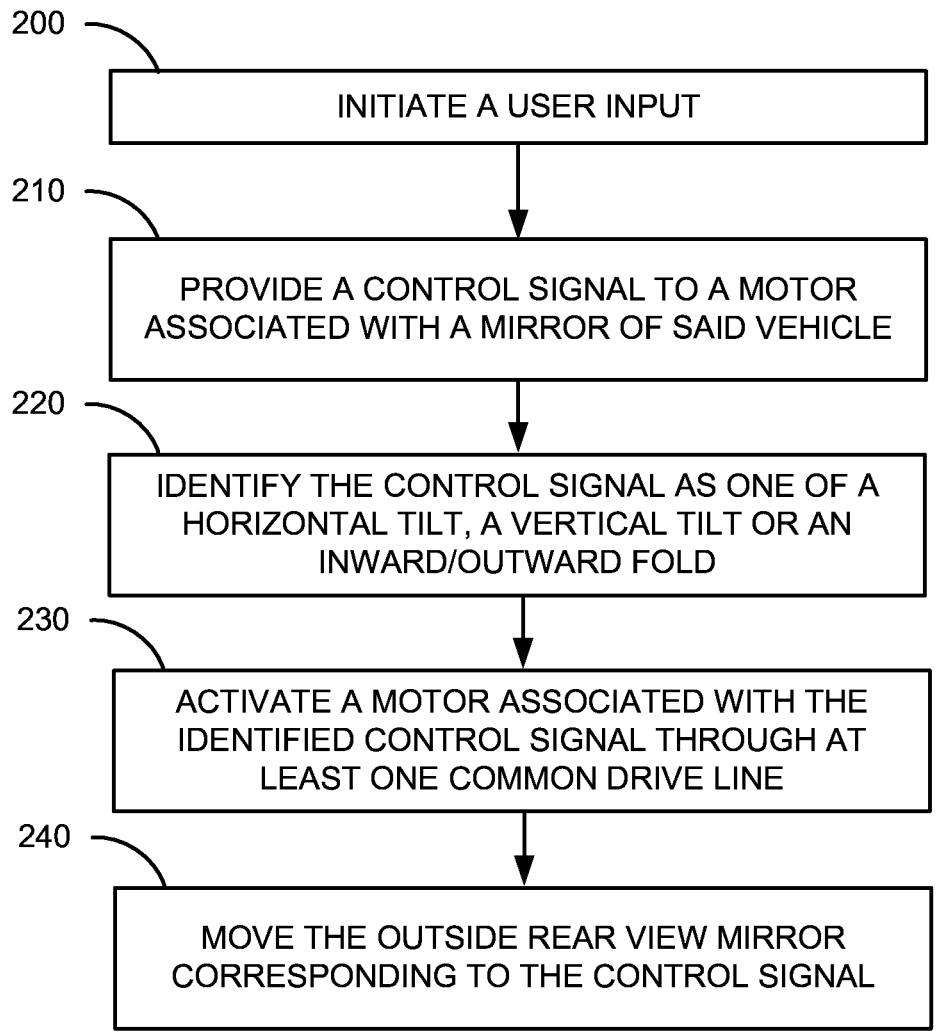
FIG. 5 is an illustration of a method in accordance with an example embodiment of the present invention.

Moreover, FIG. 5 provides a method of controlling movement of an outside rear view mirror of a vehicle by employing the systems described herein. In step 200, a user initiates an input directed to one or more mirror controls. In step 210, a control signal is provided to a motor associated with the control corresponding to the user input. In step 220, the control signal is identified at the ECU as being one of a horizontal tilt, vertical tilt, or an inward/outward fold. At 230, a motor associated with the identified control signal is activated through the shared driveline. In step 240, the side view mirror corresponding to the control signal is moved accordingly.

It should be appreciated that motor movement is controlled by controlling the direction of current flow through the motors, which is accomplished by controlling the driveline connectors between the low side drive and high side drive circuits.

From the above description of the invention, those skilled in the art will perceive improvements, changes and modifications. Such improvements, changes and modifications within the skill of the art are intended to be covered by the present invention.

Having described the invention, the following is claimed:

1. A system for controlling movement of an outside rear view mirror of a vehicle comprising:
    a plurality of outside rear view mirrors, each mirror comprising a mirror housing and at least one motor configured to control mirror tilt, and one motor to control an inward/outward fold of the mirror housing; and
    an electronic control unit including:
    a controller to process mirror movement commands;
    at least one switch to provide said mirror movement commands; and
    a plurality of drivelines, wherein each of the motors is connected to a shared driveline, and each of the motors is further connected to an associated driveline.

2. The system of claim 1 wherein the electronic control unit is connected to an ignition switch of the vehicle, the electronic control unit controlling the mirror fold motor in response to a state of the ignition switch.

3. The system of claim 1 wherein the at least one switch includes a fold command switch, wherein engaging the fold command switch activates the mirror fold motor.

4. A system for controlling movement of an outside rear view mirror of a vehicle comprising:
    an outside driver's side rear view mirror having a horizontal tilt motor for controlling the horizontal tilt of the mirror, a vertical tilt motor for controlling the vertical tile of the mirror, and a fold mirror motor for controlling the fold of the outside driver's side mirror housing relative to the vehicle body;
    an outside passenger's side rear view mirror having a horizontal tilt motor for controlling the horizontal tilt of the mirror, a vertical tilt motor for controlling the vertical tile of the mirror, and a fold mirror motor for controlling the fold of the outside passenger's side mirror housing relative to the vehicle body; and
    an electronic control unit including:
    a controller to process mirror movement commands;
    at least one switch to provide said mirror movement commands; and
    a plurality of drivelines, wherein each of the motors on both the driver's side rear view mirror and the passenger's side rear view mirror are connected to a shared driveline, and each of the motors is further connected to an associated driveline.

5. The system of claim 4 wherein the electronic control unit is connected to an ignition switch of the vehicle, the electronic control unit controlling the mirror fold motors in response to a state of the ignition switch.

6. The system of claim 4 wherein the at least one switch includes a fold command switch, wherein engaging the fold command switch activates the mirror fold motors.

7. A method of controlling movement of a side view mirror of a vehicle, the method comprising the steps of:
    initiating a user input;
    providing a control signal to a motor associated with a mirror of said vehicle in response to the user input;
    identifying the control signal as one of a horizontal tilt, a vertical tilt or an inward/outward fold;
    activating a motor associated with the identified control signal through at least one common drive line and one dedicated drive line; and
    moving the side view mirror corresponding to the control signal.

8. The method of claim 7, wherein the user input comprises engaging an ignition associated with the vehicle, the control signal being initiated automatically in response thereto.

* * * * *